HIGH LEVEL COLOUR DEMODULATION SYSTEM

Filed Nov. 20, 1958 2 Sheets-Sheet 1

INVENTORS
PATRICK A. WIGLEY
RONALD LISTER
BY
Frank R. Jeffri
AGENT

HIGH LEVEL COLOUR DEMODULATION SYSTEM

Filed Nov. 20, 1958 2 Sheets-Sheet 2

INVENTORS
PATRICK A. WIGLEY
RONALD LISTER
BY
Frank R. Trifari
AGENT

United States Patent Office 3,042,746

Patented July 3, 1962

3,042,746

HIGH LEVEL COLOUR DEMODULATION SYSTEM

Patrick Augustus Wigley and Ronald Lister, Scarborough, Ontario, Canada, assignors to North American Philips Company, Inc., New York, N.Y., a corporation of Delaware Filed Nov. 20, 1958, Ser. No. 775,233
Claims priority, application Canada Nov. 20, 1957
4 Claims. (Cl. 178—5.4)

The present invention relates to receivers for use in a system for transmitting colour television signals in which the transmitted signal comprises a signal component essentially relating to the brightness of a scene and further comprises a signal component consisting of an auxiliary carrier-wave modulated in quadrature with two signals of different bandwidths, each of which consists of a given combination of signals relating to the respective colour components of the scene, which combinations are such as to obtain by linear operations colour difference signals from the two signals of different bandwidths.

The term "colour difference signals" is to be understood to mean signals constituting the difference between a signal relating to a given colour component of the scene, that is the green, the red or the blue light component of the scene, and the signal component substantially relating to the brightness of the scene.

In a known system of the aforesaid type, the signal of smaller bandwidth, the so-called Q-signal, is limited to 500 kc./s., while the signal of larger bandwidth, the so-called I-signal, is limited to 1500 kc./s. The quadrature component of the auxiliary carrier, which is modulated with the Q-signal, is double side-band modulated to 500 kc./s.; the quadrature component modulated with the I-signal, the frequencies of which range of from 0 kc./s. single side-band from 500 kc./s. to 1500 kc./s.

The component substantially relating to the brightness, that is the Y-signal, substantially corresponds to the luminance signal of a black-and-white television system.

In the receiver, the I-signal and the Q-signal can be rewon from the quadrature-modulated auxiliary carrier-wave by means of synchronous detectors. If demodulation occurs in the direction of the I-axis of the auxiliary carrier, the signal part of the I-signal, the frequencies of which are above 500 kc./s., are obtained with the correct phase relation with regard to the signal part of the I-signal, the frequencies of which range from 0 kc./s. to 500 kc./s. However, the amplitude of the first-mentioned part is only half the required amplitude. Since the human eye is relatively insensitive to abrupt colour variations, of which the first-mentioned signal portion is representative, no steps are in general taken for restoring the correct amplitude relation.

From the I- and Q-signals thus obtained, the colour difference signals—the $(R-Y)$-signal and the $(B-Y)$-signal, are subsequently formed according to the formula:

$$E'_R-E'_Y=0.62\ E'_Q+0.96\ E'_I \quad (1)$$
$$E'_B-E'_Y=1.70\ E'_Q-1.10\ E'_I \quad (2)$$

$E'_R$ represents the signal relating to the red light component of the scene to be reproduced, $E'_B$ represents the signal relating to the blue light component of the scene, $E'_Y$ represents the Y-signal, $E'_Q$ represents the Q-signal and $E'_I$ represents the I-signal. The accents indicate that the required gamma-correction has already been made in composing the various signals. Subsequently, $E'_G-E'_Y$ can be deduced from $E'_R-E'_Y$ and $E'_B-E'_Y$. $E'_G$ is the signal relating to the green light-component of the scene. Combination of the various colour-difference signals and the luminance signal finally yields colour signals $E'_R$, $E'_B$ and $E'_Q$.

The aforesaid method suffers from a limitation in that combination of the I-signals and Q-signals to form the colour-difference signals, by means of so-called matrix-networks, involves great loss of signal voltage. Hence, the colour signals or the colour-difference signals have to be subjected to additional amplification which, beside additional valves, involves in general that the direct current component has to be introduced into the amplified signals.

In order to avoid this disadvantage, recourse has been had to high level demodulators which are fundamentally based on the principle of anode-detection. The reference signal required in synchronous detection, the frequency of which signal corresponds to the frequency of the auxiliary carrier-wave and which has a particular phase relation with regard to the auxiliary carrier-wave, is applied to the grid of a triode valve, to the anode of which the modulated auxiliary carrier-wave is applied. An appropriate choice of said phase relation yields demodulation of the desired signal whilst, however, involving a considerable conversion-amplification.

High level demodulation occurs in the direction of the $(R-Y)$—and $(B-Y)$-axes and, as the case may be, moreover in the direction of the $(G-Y)$-axis. The $(G-Y)$-signal, instead of being obtained by means of a separate demodulator, is also obtainable by a suitable combination of the $(R-Y)$-signal and the $(B-Y)$ signal:

$$E'_G-E'_Y=-0.51\ (E'_R-E'_Y)-0.19\ (E'_B-E'_Y)$$

When using a tricolour reproducing device comprising three electron guns, combination of the colour-difference signals with the luminance signal may occur in the control circuits of these guns, for example by applying a colour-difference signal to the control grid of such a gun, and the luminance signal to the cathode of the gun.

The advantage of high level demodulation in the direction of the $(R-Y)$-axis and the $(B-Y)$-axis and, as the case may be, the $(G-Y)$-axis, is that the output signals of the demodulators can then be directly supplied, without the intermediary of additional amplifiers, to the reproducing device.

High level demodulation in the direction of the axis of the colour-difference signals, has however, a limitation. In this case, the phase relation of the signal portion the frequencies of which are above 500 kc./s. with regard to the frequencies of the signal parts, the frequencies of which amount of from 0 kc./s. to 500 kc./s., is no longer correct to such a degree that, in practice, the various colour-difference signals are limited in bandwidth to 500 kc./s. in order to avoid undue errors in reproduction. This however, has the disadvantage that the fine details are lost in colour-reproduction of the image.

The present invention relates to receivers in which the loss of fine details in colour reproduction of the image is avoided without the advantage of high level demodulation need be lost.

For this purpose, the receiver according to the invention has the feature that the modulated auxiliary carrier-wave is supplied to at least two synchronous, preferably high level demodulators, in which the auxiliary carrier-wave is demodulated in the direction of the axis of relatively different colour-difference signals with respect to frequencies within the frequency range of the signal of smaller bandwidth while the auxiliary carrier-wave is moreover demodulated with regard to frequencies outside the frequency range of the signal of smaller bandwidth, and the detection result of this last-mentioned demodulation is supplied to one or more of the colour-difference signals with a phase corresponding to the phase of the detection result which would be obtained on demodulation of the auxiliary carrier-wave in the direction of the axis of the signal of larger bandwidth.

The invention will now be described in detail with reference to the following drawings of which FIGURE 1 shows the colour phase diagram useful in explaining the invention;

FIGURE 2 shows a block diagram of a part of a colour television receiver in accordance with the invention which is designed to demodulate along the $(R-Y)$ and $(B-Y)$ axis;

FIGURES 3*a*, 3*b*, 3*c* and 3*d* show the phase and amplitude characteristics respectively of the detected $(R-Y)$ and $(B-Y)$ signals;

FIGURES 4*a*, 4*b*, 4*c* show the phase and amplitude characteristics of filters designed to correct the characteristics shown in FIGURE 3;

Figures 1, 5:
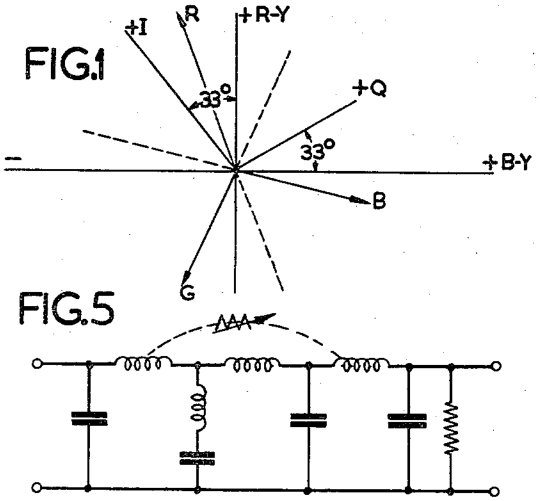
FIGURE 5 is a diagram of a basic filter adapted to provide the required response characteristics of FIGURE 4.

In order to more clearly describe the present invention, a mathematical analysis of demodulation along the $(R-Y)$ and $(B-Y)$ axis is given with respect to the well-known colour phase diagram, shown in FIGURE 1 of the system known as the N.T.S.C. system.

The chrominance information of the N.T.S.C. signal is given by:

$$E_C = E_Q \sin(\omega t + 33^\circ) + E_I \cos(\omega t + 33^\circ) \qquad (3)$$

$E_Q$ and $E_I$ are the modulating voltages and for purposes of analysis a single Fourier component will be considered. The summation of all Fourier components would result in $E_I$ or $E_Q$, hence the same analysis would apply for all such components.

Let $$E_Q = e_q \sin(\alpha t + \rho) \text{ and } E_I = e_i \sin(\beta t + \gamma)$$

Rewriting Equation 3:

$$E_C = e_q \sin(\alpha t + \rho) \sin(\omega t + 33^\circ) + e_i \sin(\beta t + \gamma) \cos(\omega t + 33^\circ) = \frac{e_q}{2}[\cos(\alpha t + \rho - \omega t - 33^\circ) - \cos(\alpha t + \rho + \omega t + 33^\circ)]$$

$$+\frac{e_i}{2}[\sin(\beta t + \gamma - \omega t - 33^\circ) + \sin(\beta t + \gamma + \omega t + 33^\circ)] \qquad (4)$$

This is the general formula of a suppressed subcarrier signal with double sideband transmission. The process of demodulating the above is treated in a simplified manner as being the product of the sidebands and a $\sin(\omega t + \theta)$ function, where $\theta$ is the phase angle of the demodulating frequency compared with the $(B-Y)$ phase.

The demodulated output is:

$$= \frac{e_q}{2}[\cos(\alpha t + \rho - \omega t - 33^\circ) \sin(\omega t + \theta) - \cos(\alpha t + \rho + \omega t + 33^\circ) \sin(\omega t + \theta)] + \frac{e_i}{2}[\sin(\beta t + \gamma - \omega t - 33^\circ) \sin(\omega t + \theta) + \sin(\beta t + \gamma + \omega t + 33^\circ) \sin(\omega t + \theta)]$$

$$= \frac{e_q}{4}[\sin(2\omega t + \theta - \alpha t - \rho + 33^\circ) + \sin(\theta + \alpha t + \rho - 33^\circ) - \sin(\theta - \alpha t - \rho + 33^\circ) - \sin(2\omega t + \theta + \alpha t + \rho + 33^\circ)] + \frac{e_i}{4}[\cos(2\omega t + \theta - \beta t - \gamma + 33^\circ) - \cos(\theta + \beta t + \gamma - 33^\circ) + \cos(\theta - \beta t - \gamma - 33^\circ) - \cos(2\omega t + \theta + \beta t + \gamma + 33^\circ)]$$

Ignoring the second harmonic terms (i.e. $2\omega t$), since it is assumed that the demodulator output circuit has no response to this frequency, it follows that the output is:

$$\frac{e_q}{4}[\sin(\alpha t + \theta + \rho - 33^\circ) - \sin(\alpha t + \theta - \rho - 33^\circ)] + \frac{e_i}{4}[\cos(-\beta t - \gamma + \theta - 33^\circ) - \cos(\beta t + \theta + \gamma - 33^\circ)]$$

$$= \frac{e_q}{2} \cos(\theta - 33^\circ) \sin(\alpha t + \rho) + \frac{e_i}{2} \sin(\theta - 33^\circ) \sin(\beta t + \gamma) \qquad (5)$$

It will be noted from Equation 5, with due regard to operating constants, that the original low frequency terms have been recovered, namely $\sin(\alpha t + \rho)$ and $\sin(\beta t + \gamma)$.

So far the above analysis has dealt only with double sideband transmission. For the region of single sideband transmission, the following applies. Only the lower $e_i$ sideband is present for which the demodulated output is:

$$= \frac{e_i}{2} \sin(\beta t + \gamma - \omega t - 33^\circ) \sin(\omega t + \theta)$$

$$= \frac{e_i}{4}[\cos(2\omega t + \theta - \beta t - \gamma + 33^\circ) - \cos(\theta + \beta t + \gamma - 33^\circ)]$$

As was done previously, the second harmonic term is disregarded, hence:

$$\text{Output} = -\frac{e_i}{4} \cos(\beta t + \gamma + \theta - 33^\circ)$$

$$= \frac{e_i}{4} \sin(\beta t + \gamma + \theta - 123^\circ) \qquad (6)$$

As before, the low frequency term has been recovered, however with an accompanying phase angle given by $(\theta - 123^\circ)$. Also the output is half the double sideband output.

Equations 5 and 6, then, represent the general case of double and single sideband demodulated outputs. The demodulation axis is determined by the phase angle $\theta$.

Consider now the case of demodulating along $(R-Y)$ and $(B-Y)$ axis. For this $\theta = 90^\circ$ and $0^\circ$ respectively.

In the $(B-Y)$ direction:

Double sideband output=

$$\frac{e_q}{2}[\cos(-33^\circ) \sin(\alpha t + \rho)] + \frac{e_i}{2}[\sin(-33^\circ) \sin(\beta t + \gamma)]$$

$$= \frac{0.839}{2} e_q \sin(\alpha t + \rho) - \frac{0.544}{2} e_i \sin(\beta t + \gamma) \qquad (7)$$

Single sideband output=

$$\frac{e_i}{4} \sin(\beta t + \gamma - 123^\circ) = \frac{e_i}{4} \sin(\beta t + \gamma + 57^\circ) \qquad (8)$$

In the $(R-Y)$ direction:

Double sideband output=

$$\frac{e_q}{2}[\cos 57^\circ \sin(\alpha t + \rho)] + \frac{e_i}{2}[\sin 57^\circ \sin(\beta t + \gamma)]$$

$$= \frac{0.544}{2} e_q \sin(\alpha t + \rho) + \frac{0.839}{2} e_i \sin(\beta t + \gamma) \qquad (9)$$

Single sideband output=

$$\frac{e_i}{4} \sin(\beta t + \gamma - 33^\circ) \qquad (10)$$

since $$\sum_{0}^{1500 \text{ kcs.}} e_i \sin(\beta t + \gamma) = E'_I$$

and $$\sum_{0}^{1500 \text{ kcs.}} e_q \sin(\alpha t + \rho) = E'_Q$$

then Equations 7, 8, 9 and 10 can be rewritten, disregarding the $$\frac{1}{2}$$

demodulation constant, as follows—

At $(B-Y)$ terminal:

$$\text{Double sideband output} = 0.839E'_Q - 0.544E'_I \qquad (11)$$

$$\text{Single sideband output} = 0.5E'_I\underline{|-123^\circ} = -0.5E'_I\underline{|57^\circ} \qquad (12)$$

At the $(R-Y)$ terminal:

$$\text{Double sideband output} = 0.544E'_Q + 0.839E'_I \qquad (13)$$

$$\text{Single sideband output} = 0.5E'_I\underline{|-33^\circ} \qquad (14)$$

In order to evaluate these latter equations, it is necessary to rearrange the N.T.S.C. equations for $E'_Q$ and $E'_I$ as follows:

$$E'_Q=0.41(E'_B-E'_Y)+0.48(E'_R-E'_Y) \quad (15)$$

$$E'_I=-0.27(E'_B-E'_Y)+0.74(E'_R-E'_Y) \quad (16)$$

Substituting in Equations 11 and 13 the following is obtained—

From 11:

$$(B-Y)\text{ output}=0.839[0.41(E'_B-E'_Y)+0.48(E'_R-E'_Y)]-0.544[-0.27(E'_B-E'_Y)+0.74(E'_R-E'_Y)]=0.49(E'_B-E'_Y)\text{ double sideband}$$

The corresponding single sideband output required for this is (see Equation 2)

$$=0.49(-1.10E'_I)=-0.54E'_I$$

From 13:

$$(R-Y)\text{ output}=0.544[0.41(E'_B-E'_Y)+0.48(E'_R-E'_Y)]+0.839[-0.27(E'_B-E'_Y)+0.74(E'_R-E'_Y)]=0.88(E'_R-E'_Y)$$

The corresponding single sideband output required for this is (see Equation 1)

$$=0.88(0.96E'_I)=0.84E'_I$$

Summarizing these results—

At the $(B-Y)$ terminal:

Double sideband output$=0.49(E'_B-E'_Y)$
Required single sideband output$=-0.54E'_I$
Single sideband output obtained$=-0.5E'_I\underline{|57°}$ At the $(R-Y)$ terminal:

Double sideband output$=0.88(E'_R-E'_Y)$
Required single sideband output$=0.84E'_I$
Single sideband output obtained$=0.5E'_I\underline{|-33°}$ Examination of above results show that errors of both amplitude and phase occur in the single sideband region, when demodulating along colour difference axis.

It will be noted that the amplitude from the $(B-Y)$ demodulator does not differ from the desired output by very much (approximately 8%), however a phase correction of 57° is required for the single sideband frequencies. The $(R-Y)$ demodulator will produce an error of amplitude (approximately 5 db) and a phase error of $-33°$. In this case, both these errors would require correction before satisfactory operation could be obtained.

Figures 3, 4:
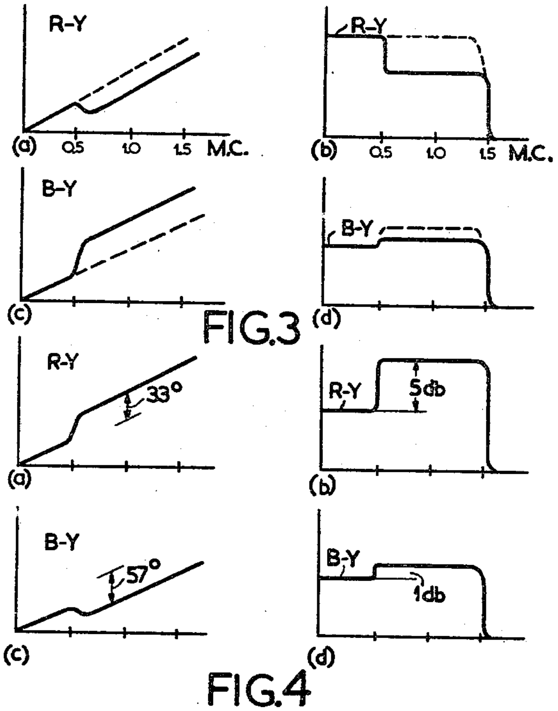

FIGURE 3 shows the phase and amplitude characteristics of the detected $(R-Y)$ and $(B-Y)$ signals. The dashed curve shows the desired characteristic.

Figure 2:
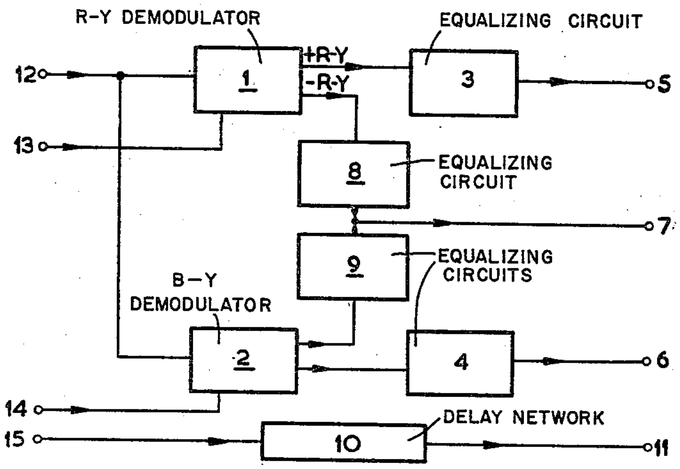

Referring now to FIGURE 2, the block diagram shows the detection and equalizing sections of a colour television receiver designed to demodulate on the $(R-Y)$ and $(B-Y)$ vectors and compensate for the resultant distortion of the higher chrominance frequencies.

The block diagram of FIGURE 2 comprises an $(R-Y)$ demodulator 1, a $(B-Y)$ demodulator 2, to which are supplied at terminal 12 the chrominance signal and at terminals 13 and 14 the reference signals with appropriate phase angles. Each of the demodulators supplies its output through the medium of appropriate equalizing networks 3 and 4, to the control grids 5 and 6 of the red and blue guns respectively.

Selected proportions of the detected $(R-Y)$ and $(B-Y)$ signals are fed through equalizing circuits 8 and 9 to the control grid 7 of the green gun so that the following equations are satisfied: Signal at $(E_G-E_Y)$—

$$\text{Double sideband region}=-0.51(E'_R-E'_Y)-0.19(E'_B-E'_Y)$$

$$\text{Single sideband region}=-0.51(0.96E'_I)-0.19(1.10E'_I)=-0.70E'_I$$

In high level demodulation balanced modulators are usually employed and thus negative signals $-(B-Y)$ and $-(R-Y)$ are readily available.

In order that the $(R-Y)$ and $(B-Y)$ signals be corrected in phase and amplitude, the signals must be passed through appropriate equalizing circuits which have the amplitude and phase characteristics as shown in FIGURE 4. It is possible to obtain close approximations to these desired characteristics by the use of a filter network, a basic diagram of which is shown in FIGURE 5. The components must, of course, be adjusted in each case to give the proper correction for the colour signal concerned.

In carrying out the embodiment of the invention as shown in FIGURE 2, in order to obtain the $(G-Y)$ signal, the $-(R-Y)$ and $-(B-Y)$ signals can be mixed prior to equalization thus saving one filter network. Alternately, the $(G-Y)$ signal may be produced by the equalized $(R-Y)$ and $(B-Y)$ signals, consideration being given to the required phases, i.e. the $-(R-Y)$ and $-(B-Y)$ signals are used to produce $(G-Y)$.

When the proper correction is applied and the amplitude of each colour difference signal is adjusted to suit the efficiency of the appropriate gun in the picture tube, a colour picture of high quality may be obtained. The Y-signal applied at terminal 15 is fed through an appropriate delay-network 10 to the cathodes 11 of the guns of the picture tube.

Figure 6:
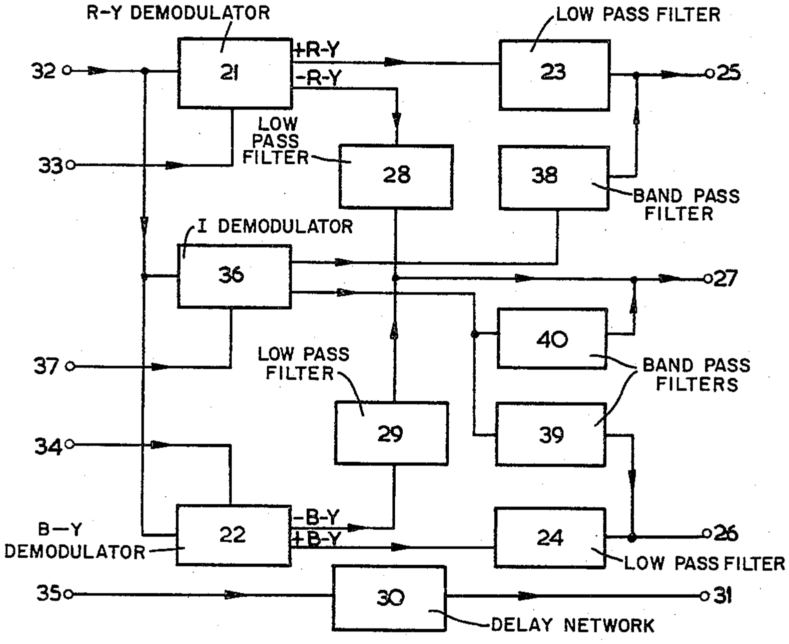
FIGURE 6 shows a block diagram of a further embodiment of the invention wherein the high frequency chrominance components are detected along the I-axis.

A further embodiment of the invention is shown in the block diagram of FIGURE 6 wherein only the portions of the colour television receiver, with which the invention is concerned, are shown.

In this embodiment demodulation is again carried out on the $(R-Y)$ and $(B-Y)$ vectors in demodulators 21 and 22 to which are supplied at terminal 32 the chrominance signal and at terminals 33 and 34 the reference signals with appropriate phase angles. The outputs of these detectors are supplied to the appropriate red and blue guns 25 and 26 through low pass filters 23 and 24 having a cut-off frequency of 500 kcs. As was shown previously, the distortion in the detected signal is contained in the frequencies above 500 kcs. Thus, by use of low pass filters this distortion is blocked from the control grids of the red and blue picture tube guns.

Similarly the proper proportions of the negative counterparts of the $(R-Y)$ and $(B-Y)$ signals are passed through low pass filters 28 and 29, having a cut-off frequency of 500 kcs., to the control grid 27 of the green gun.

In order that a high quality colour picture result, detection of the chrominance signal is also carried out along the I axis so that a distortion-free signal is produced. To that end the chrominance signal at terminal 32 is also applied to a demodulator 36, to which is also supplied at terminal 37 a reference signal with appropriate phase angle. The output of the I demodulator is supplied to the red, blue and green gun control grids 25, 26 and 27 through bandpass filters 38, 39 and 40 which transmit signals in the range of 500 kcs. to 1500 kcs. The I signals will be in the correct phase relationship with the other colour signals applied to the control grids of the colour tube guns. Correction can easily be made for the discrepancies in amplitude. The Y-signal supplied at terminal 35 is fed through an appropriate delay-network 30 to the cathodes 31 of the guns of the picture tube.

From the foregoing it will readily be seen that the invention discloses a television demodulation and reproduction system which allows for high quality colour picture production at a reduced cost.

What is claimed is:

1. A receiver for color television signals of the type comprising a first signal substantially relating to the brightness of a scene, and a second signal consisting of an auxiliary carrier-wave modulated in quadrature with third and fourth signals, said third signal having a larger bandwidth than said fourth signal, each of said third and fourth signals consisting of a given combination of signals relating to respective color components of the scene, the combinations permitting formation of color difference signals of different bandwidths by linear operations, said receiver comprising first and second synchronous demodulators, means applying said second signal to said demodulators, means applying oscillations of the frequency of said auxiliary carrier-wave to said demodulators, said oscillations having respective phases whereby said second signals are demodulated in said first and second demodulators in the direction of the axes of first and second color difference signals to provide first and second output signals respectively, and first and second equalizing network means connected to said first and second demodulators respectively for equalizing said first and second output signals respectively, said network means having phase characteristics providing such a phase displacement of said output signals, for signals outside of the frequency band of said fourth signals, that the resultant signals outside of said frequency band have the phase that would occur on demodulation of said second signal in the direction of the axis of said third signal.

2. The receiver of claim 1, in which means are provided to combine said first and second output signals to provide a third output signal corresponding to a third color difference signal.

3. A receiver for color television signals of the type comprising a first signal substantially relating to the brightness of a scene, and a second signal consisting of an auxiliary carrier-wave modulated in quadrature with third and fourth signals, said third signal having a larger bandwidth than said fourth signal, each of said third and fourth signals consisting of a given combination of signals relating to respective color components of the scene, the combinations permitting formation of color difference signals of different bandwidths by linear operations, said receiver comprising synchronous demodulator means, a source of reference oscillations of the frequency of said auxiliary carrier-wave and having a phase corresponding to the phase of a selected color difference signal, means applying said reference oscillations and second signal to said synchronous demodulator means to provide an output signal, and means for correcting the phase and amplitude of said output signals in the frequency band of said third signal which exceeds the frequencies of said fourth signal, said correcting means comprising equalizing network means connected to the output of said synchronous demodulator means and having such phase and amplitude characteristics, for signals in said frequency band, that the resultant output signals in said frequency band have the phase and amplitude that would occur by demodulation of said second signal in the direction of the axis of said third signal.

4. A receiver for color television signals of the type comprising a first signal substantially relating to the brightness of a scene, and a second signal consisting of an auxiliary carrier-wave modulated in quadrature with third and fourth signals, said third signal having a larger bandwidth than said fourth signal, each of said third and fourth signals consisting of a given combination of signals relating to respective color components of the scene, the combinations permitting formation of color difference signals of different bandwidths by linear operations, said receiver comprising first and second synchronous demodulator means, means providing first and second reference oscillations of the frequency of said auxiliary carrier-wave and having different phases corresponding to selected color difference signals, means applying said first reference oscillation and said second signal to said first demodulator means, means applying said second reference oscillation and said second signal to said second demodulator means, and first and second equalizing network means connected to the outputs of said first and second demodulator means respectively, said network means having phase and amplitude characteristics providing such a phase displacement and amplitude correction for the output signals of said demodulator means, for signals in the frequency band of said third signal exceeding the frequencies of said fourth signal, that the resultant signal output of said network means in said frequency band have the phase and amplitude that would occur by demodulation of said second signal in the direction of the axis of said third signal.

References Cited in the file of this patent

UNITED STATES PATENTS

| | | |
|---|---|---|
| 2,831,919 | Lockhart | Apr. 22, 1958 |
| 2,857,457 | Richman | Oct. 21, 1958 |
| 2,908,752 | Lockhart | Oct. 13, 1959 |